J. M. GANTVOORT.
BAKING APPARATUS.
APPLICATION FILED JUNE 12, 1912.
1,135,172.
Patented Apr. 13, 1915.
3 SHEETS—SHEET 1.
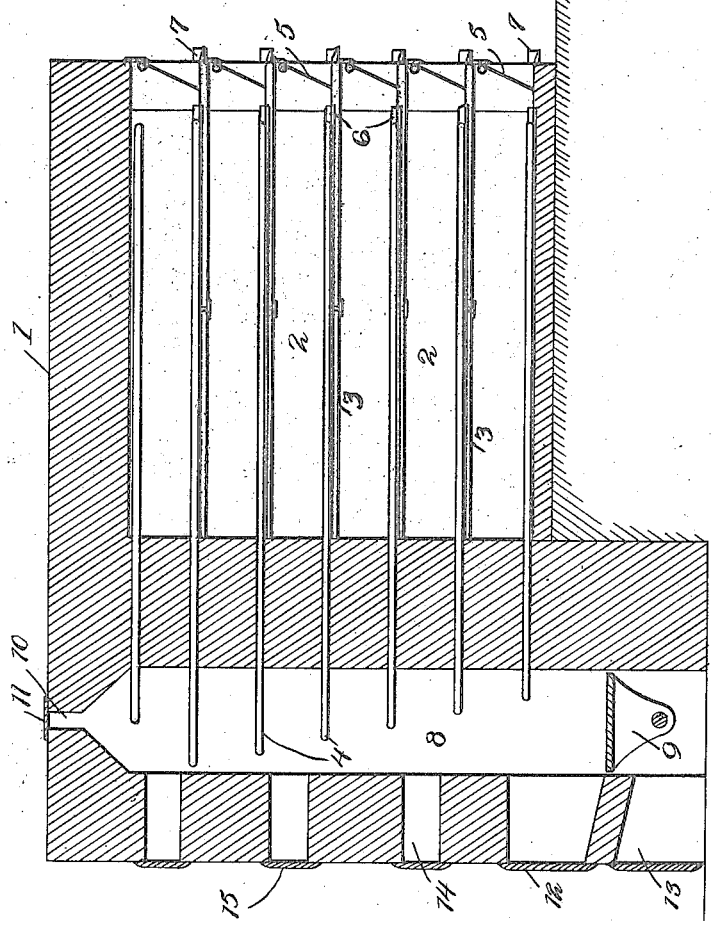
Witnesses
William Smith
C. C. Hines
Inventor
J. M. Gantvoort.
By Victor J. Evans
Attorney

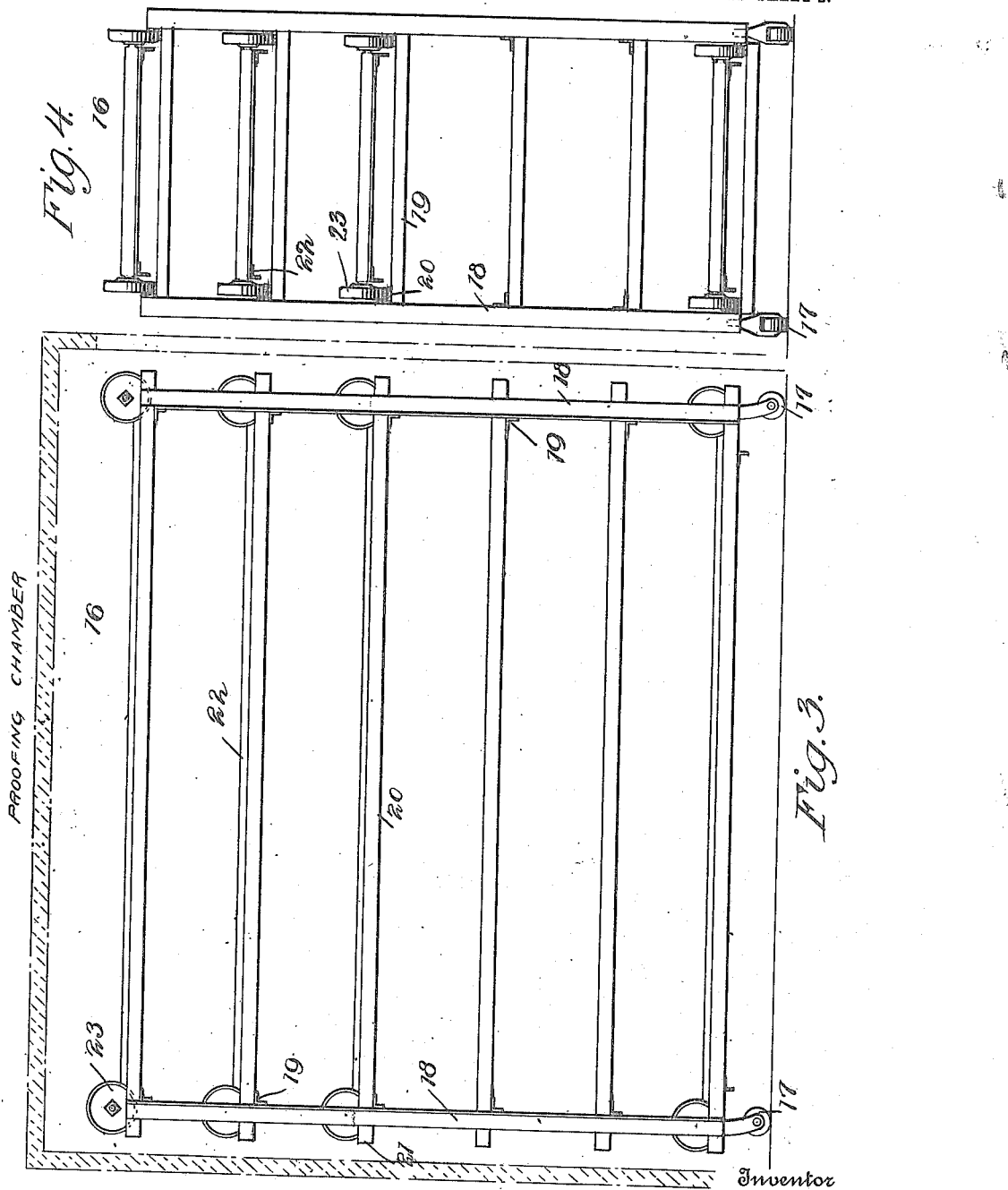

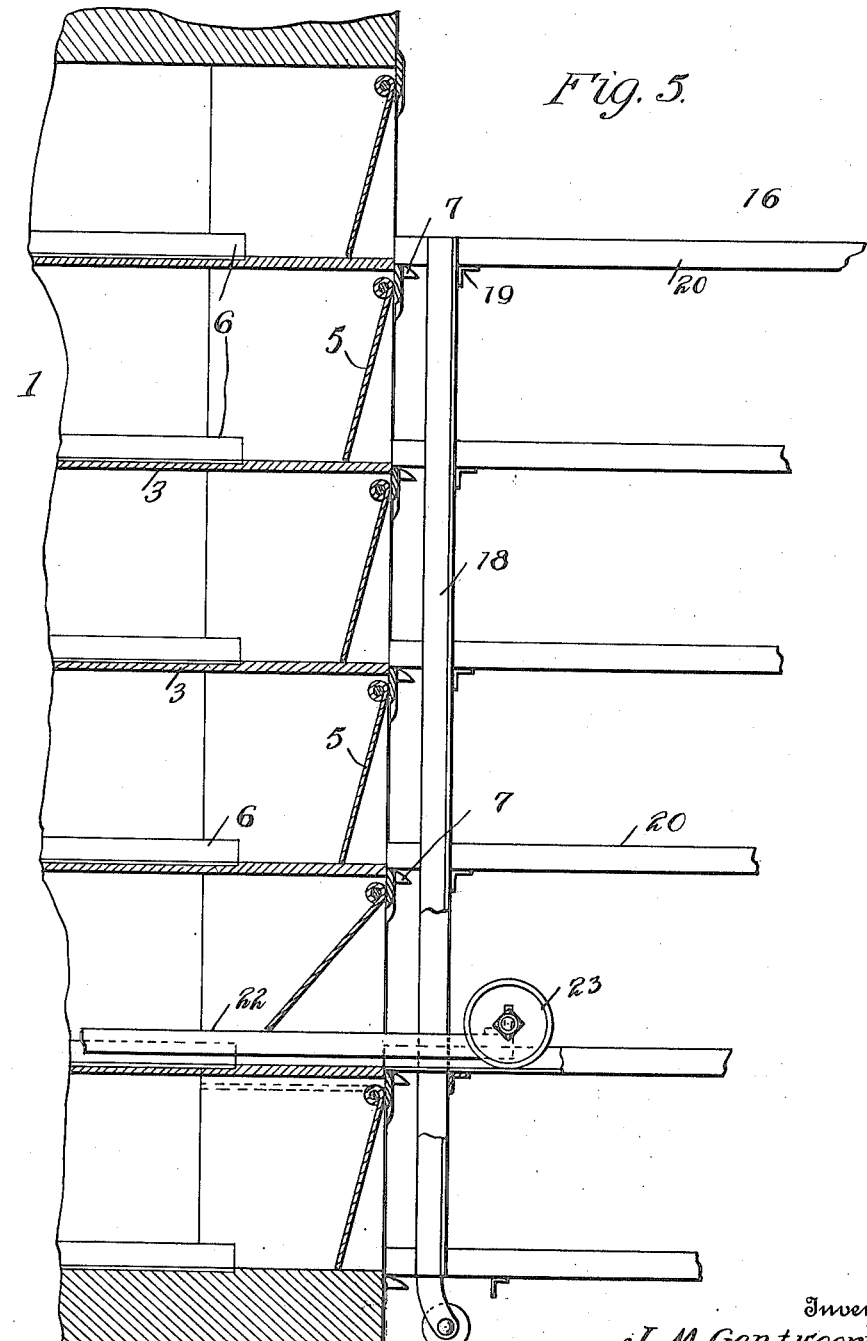

UNITED STATES PATENT OFFICE.

JOHANNUS M. GANTVOORT, OF FISHKILL LANDING, NEW YORK.

BAKING APPARATUS.

1,135,172.

Specification of Letters Patent. Patented Apr. 13, 1915.

Application filed June 12, 1912. Serial No. 703,278.

*To all whom it may concern:*

Be it known that I, JOHANNUS M. GANTVOORT, a subject of the Queen of the Netherlands, residing at Fishkill Landing, in the county of Dutchess and State of New York, have invented new and useful Improvements in Baking Apparatus, of which the following is a specification.

This invention relates to an apparatus for charging and emptying baking ovens.

In the art of baking many kinds of pan goods, such as bread, the dough, after being shaped or molded, is put into pans, the pans put into a rack, the rack rolled into a "proofing" room where the dough is "proofed," the rack then rolled to the oven, and the pans removed, one-by-one, from the rack and inserted into the oven. After baking, the pans are again individually removed from the oven and emptied or placed back into the rack to allow the bread to cool. This procedure is sometimes varied in filling and emptying "draw plate" ovens, but in any event each pan is handled at least twice, involving the cost of a great deal of time and labor.

The object of my invention is to provide a novel charging and emptying structural means, whereby a greater portion of such time and labor will be saved, the amount of labor reduced and the work facilitated to a material extent.

The invention consists in the novel steps, features of construction, combination and arrangement of parts hereinafter fully described and claimed, reference being had to the accompanying drawings, in which:—

Figure 1 is a vertical front-to-rear section through a baking oven embodying my invention. Fig. 2 is a vertical transverse section of the same. Fig. 3 is a side elevation of the rack. Fig. 4 is a transverse section of the same. Fig. 5 is a view, showing the rack and oven arranged for transfer of the trays from one to the other.

In carrying my invention into practice, I provide a baking oven 1 having a series of superimposed baking spaces 2. In each space are bars or T-irons 3, supporting a plurality of steam heating pipes 4. The open front end or mouth of each oven chamber is normally closed by an inwardly and upwardly swinging door 5, and extending longitudinally within each baking space are rails 6, which terminate at or adjacent to the door opening. Extending from the door frame of each oven chamber is a pair of short rails or guiding projections 7 having beveled surfaces, said rails being arranged to form guides for conducting the wheeled baking floors, trays or shelves hereinafter described, into and out of the respective oven spaces. The heat supplying pipes 4 extend through the rear wall of the oven and into the fire box or combustion chamber 8 of the furnace, whereby the oven as a whole and the heating pipes are heated to the desired temperature. Within the base of the fire box is arranged a suitable grate 9, and at the top of the fire box is a chimney outlet 10 controlled by a damper 11.

12 and 13 designate the fire box and ash pit door and 14 suitable cleanout openings closed by plugs or stoppers 15. The furnace part of the oven structure may be of any suitable type.

For coöperation with the multiple oven of the type described, I employ a rack 16 mounted for transportation upon supporting wheels 17, said rack comprising a series of uprights 18, cross pieces 19 and longitudinal bars 20, the latter being formed of angle metal and constituting a series of superposed pairs of track rails spaced the same extent apart as the tracks in the respective oven spaces or chambers and equal in number to said spaces. The track rails have extension ends 21 which are adapted, when either end of the rack is moved into abutting contact with the mouth of the oven, to engage the guide extensions 7 and bring the track rails of the rack into exact alinement with the track rails in the oven chambers for the transfer of the transportable oven floors, trays or shelves, as herein fully set forth, from the oven chambers to the rack or vice versa. The bread or other goods to be baked is placed in suitable pans which are supported in suitable skeleton or open frame work, baking floors, trays or shelves 22, each of which is mounted at each of its ends upon supporting wheels or rollers 23 adapted to travel upon the track rails 6 and 20 and to support the open work body of the floor or shelf above the fixed or stationary floors of the oven chambers. In practice, the baking floors or shelves may be constructed of longitudinal and transverse strips of angle metal or other suitable material of a proper type to support any desired number of individual baking pans.

In carrying the operation of the invention into practical effect, the dough used for the production of bread or other products to be baked is molded into the desired shape and placed in baking pans, which pans are disposed within the transportable baking floors, trays or shelves, which floors or shelves are arranged in superposed relation upon the rack. When the rack is filled, it is drawn or pushed into the usual "proofing" room where the dough is "proofed", after which the rack is transported to the mouth of the oven and one of its ends brought into proper relation to dispose the track rails thereon in registering alinement with the rails in the respective oven chambers. The floors are then pushed or rolled forwardly from the outer end of the rack and run along the rails into the oven chambers. The goods are then baked in the ordinary way, the rack either being removed for other use or allowed to remain in proximity to the oven until the goods are baked. After the baking operation is completed and the rack is arranged in proper receiving position, the doors of the oven chambers are successively opened and the transportable floors or shelves drawn out of the oven chambers into the receiving spaces in the rack, which, upon the oven being emptied, may be moved to one side and the oven reloaded with floors from another rack.

It will be understood, of course, that in the baking operation the shelves perform the function of the floors proper, such floors being open for the free passage of the heat to facilitate the baking operation, and that such floors are bodily insertible into and withdrawable from the oven chambers for inter-transfer between said oven chambers and the rack. By this construction and arrangement of the parts, the necessity of individually removing the same is avoided, with economy in time and labor, as the shelves of the rack may be filled and emptied at convenient moments, and the pans may be more readily and easily inserted therein and withdrawn therefrom than is possible in the ordinary operation of charging and emptying an oven. My invention also secures all the advantages of the ordinary draw-plate oven without its disadvantages and insures a more rapid, convenient and labor-saving handling of the goods.

Having thus described the invention, I claim:—

1. A baker's installation for baking panned bread comprising a transportable rack having a series of vertically superposed and spaced baking shelves freely supported thereon, to permit of their substantially horizontal removal from the rack, a proofing chamber adapted to bodily receive the rack with loaded shelves during the proofing of the panned dough thereon, a multiple chambered oven having a capacity corresponding to the capacity of the rack, said oven having fixed, stationary means for supporting the loaded baking shelves of the rack in superposed relation substantially corresponding to that occupied by the same on the rack, said rack being readily transportable from the proofing chamber to position in front of the oven and in said position having its shelves substantially at the level of and in register with the supports therefor in the oven, whereby the shelves may be shoved substantially horizontally from the rack into the oven to permit the dough to be baked thereon and then withdrawn so that the dough pans thereon remain undisturbed from the time the rack enters the proofing room to the discharge of the baked bread therefrom after it has left the oven, substantially as described.

2. A baker's installation for baking panned bread comprising a transportable rack having a series of superposed, spaced pairs of substantially horizontal track rails, a corresponding series of independent removable baking shelves freely supported thereon to permit of their substantially horizontal serial removal from the rack, a proofing chamber adapted to bodily receive the rack with loaded shelves during the proofing of the panned dough, a multiple chambered oven having a number of superposed baking chambers corresponding to the shelves of the rack and comprising for each chamber a pair of substantially horizontal receiving rails spaced the same extent apart and corresponding in position to those on the rack when the latter is arranged in juxtaposed position before the oven, whereby the movable shelves on the rack may be shoved from the latter into the oven and again withdrawn from the latter to the rack without disturbing the panned dough thereon, substantially as described.

3. A baker's installation for baking panned bread comprising a transportable rack having a series of superposed, spaced pairs of substantially horizontal track rails, a corresponding series of independent removable baking shelves freely supported thereon to permit of their substantially horizontal serial removal from the rack, a proofing chamber adapted to bodily receive the rack with loaded shelves during the proofing of the panned dough, a multiple chambered oven having a number of superposed baking chambers corresponding to the shelves of the rack and comprising for each chamber a pair of substantially horizontal receiving rails spaced the same extent apart and corresponding in position to those on the rack when the latter is arranged in juxtaposed position before the oven, whereby the movable shelves on the rack may be shoved from the latter into the oven and again withdrawn from the latter to the rack without disturbing the panned dough thereon, the ends of the oven rails projecting beyond the face of the oven to meet the rails on the rack and guide the baking shelves from the rack into the oven.

4. A baker's installation for baking panned bread comprising a transportable rack having a series of superposed, spaced pairs of substantially horizontal track rails, a corresponding series of independent removable baking shelves freely supported thereon to permit of their substantially horizontal serial removal from the rack, a proofing chamber adapted to bodily receive the rack with loaded shelves during the proofing of the panned dough, a multiple chambered oven having a number of superposed baking chambers corresponding to the shelves of the rack and comprising for each chamber a pair of substantially horizontal receiving rails spaced the same extent apart and corresponding in position to those on the rack when the latter is arranged in juxtaposed position before the oven, whereby the movable shelves on the rack may be shoved from the latter into the oven and again withdrawn from the latter to the rack without disturbing the panned dough thereon, the ends of the rails in the oven projecting beyond the face of the latter and being flared to form guide ways, and the ends of the rails on the rack extending beyond the ends of the latter to engage said guide ends of the rails in the oven to bring the rack and oven rails into substantial alinement, for the purpose described.

5. A baker's installation for baking panned bread comprising a transportable rack having a series of superposed, spaced pairs of substantially horizontal track rails, a corresponding series of independent removable skeleton shelves freely supported thereon, a proofing chamber adapted to bodily receive the rack with loaded shelves during the proofing of the panned dough thereon, an oven having a series of superposed fixed floors dividing the oven into multiple baking chambers corresponding in number to the baking shelves on the rack, heating pipes in each chamber overlying said fixed floors, track rails at the opposite sides of each baking chamber spaced laterally apart and arranged to substantially register with a corresponding pair of rails on the rack when the latter is in juxtaposed position before the oven, and serving to receive the skeleton shelves from the rack and support them above the heating pipes during baking, substantially as described.

6. A baker's installation for baking panned bread comprising a transportable rack having a series of vertically superposed and spaced baking shelves freely supported thereon, to permit of their substantially horizontal removal from the rack, a multiple chambered oven having a capacity corresponding to the capacity of the rack, said oven having fixed, stationary means for supporting the loaded baking shelves of the rack in superposed relation substantially corresponding to that occupied by the same on the rack, said rack being readily transportable to position in front of the oven and in said position having its shelves substantially at the level of and in register with the supports therefor in the oven, whereby the shelves may be shoved substantially horizontally from the rack into the oven to permit the dough to be baked thereon and then withdrawn so that the dough pans remain undisturbed thereon until the discharge of the baked bread therefrom after it has left the oven, substantially as described.

7. A baker's installation for baking panned bread comprising a transportable rack having a series of superposed spaced pairs of substantially horizontal track rails, a corresponding series of independent removable baking shelves freely supported thereon to permit of their substantially horizontal serial removal from the rack a multiple chambered oven having a number of baking chambers and comprising for each chamber a pair of substantially horizontal receiving rails corresponding in position to those on the rack when the latter is arranged in juxtaposed position before the oven, whereby the movable shelves on the rack may be shoved from the latter into the oven and again withdrawn from the latter to the rack without disturbing the panned dough thereon, substantially as described.

8. A baker's installation for baking panned bread comprising a transportable rack having a series of superposed, spaced pairs of substantially horizontal track rails, a corresponding series of independent removable baking shelves freely supported thereon to permit of their substantially horizontal serial removal from the rack, a multiple chambered oven having a number of baking chambers corresponding to the shelves of the rack and comprising for each chamber a pair of substantially horizontal receiving rails spaced the same extent apart and corresponding in position to those on the rack when the latter is arranged in juxtaposed position before the oven, whereby the movable shelves on the rack may be shoved from the latter into the oven and again withdrawn from the latter to the rack without disturbing the panned dough thereon, the ends of the oven rails projecting beyond the face of the oven to meet the rails on the rack and guide the baking shelves from the rack into the oven.

In testimony whereof I affix my signature in presence of two witnesses.

JOHANNUS M. GANTVOORT.

Witnesses:
 IRVING D. CAMMOCK,
 FRED F. STARTUP.